Feb. 18, 1964     Y. MARCHADOUR     3,121,449
MACHINE FOR FILLING CANS OR OTHER CONTAINERS
Filed Oct. 24, 1960     3 Sheets-Sheet 1
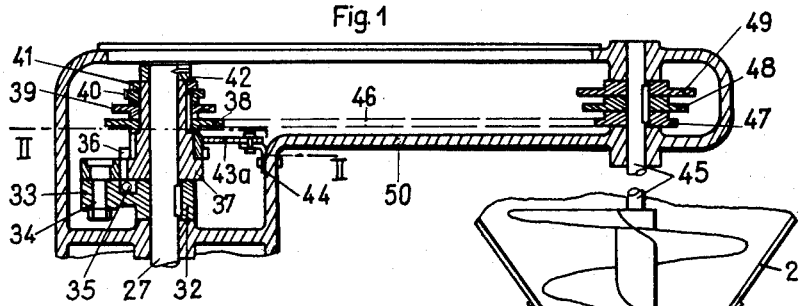
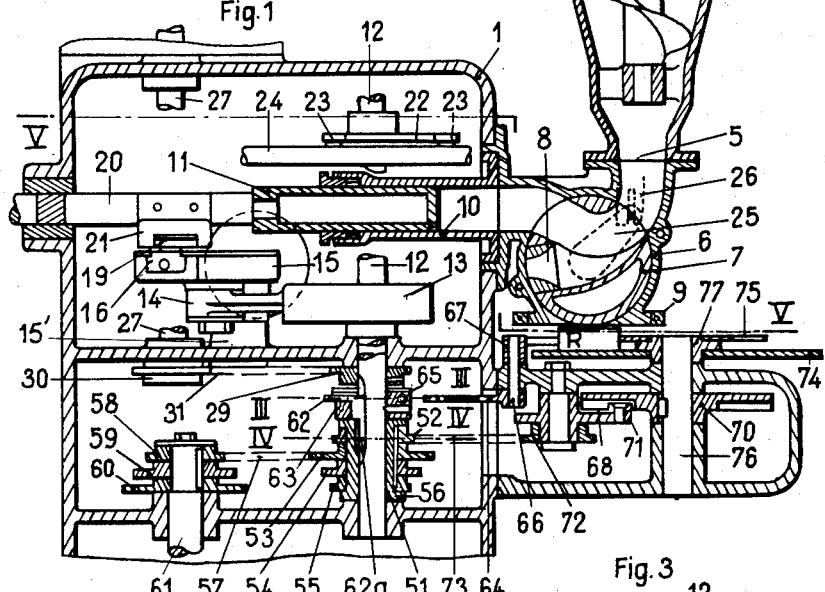
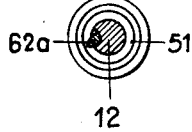
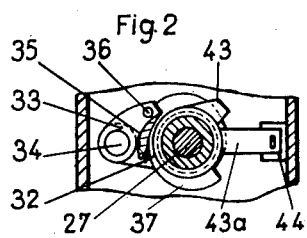
INVENTOR
YVES MARCHADOUR
BY
ATTORNEYS

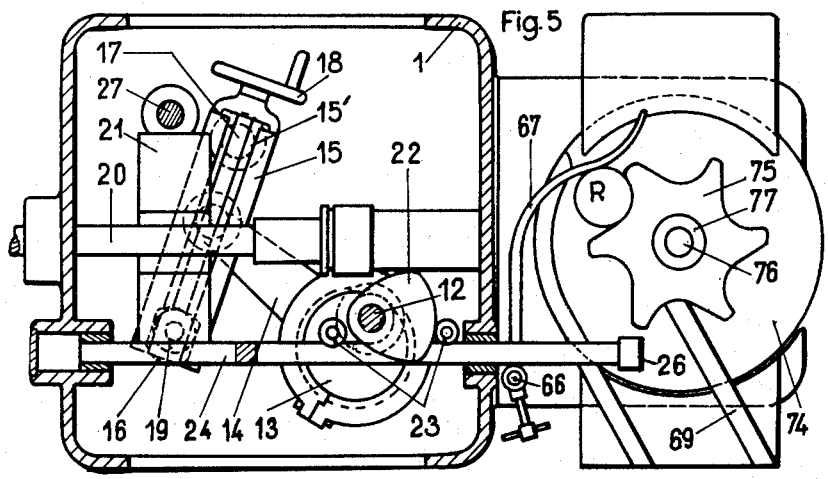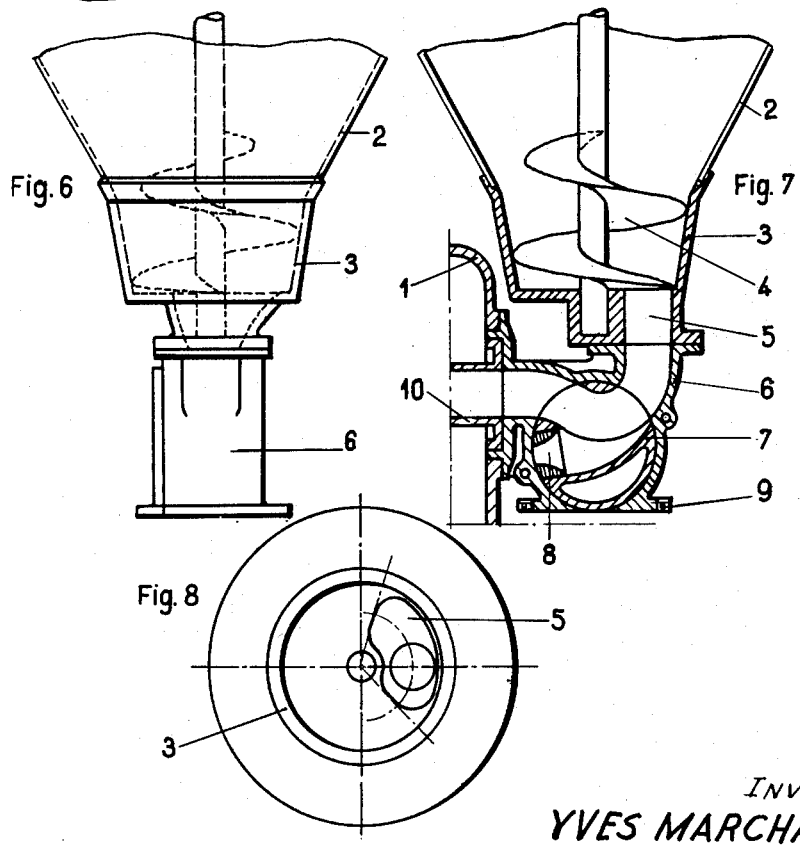

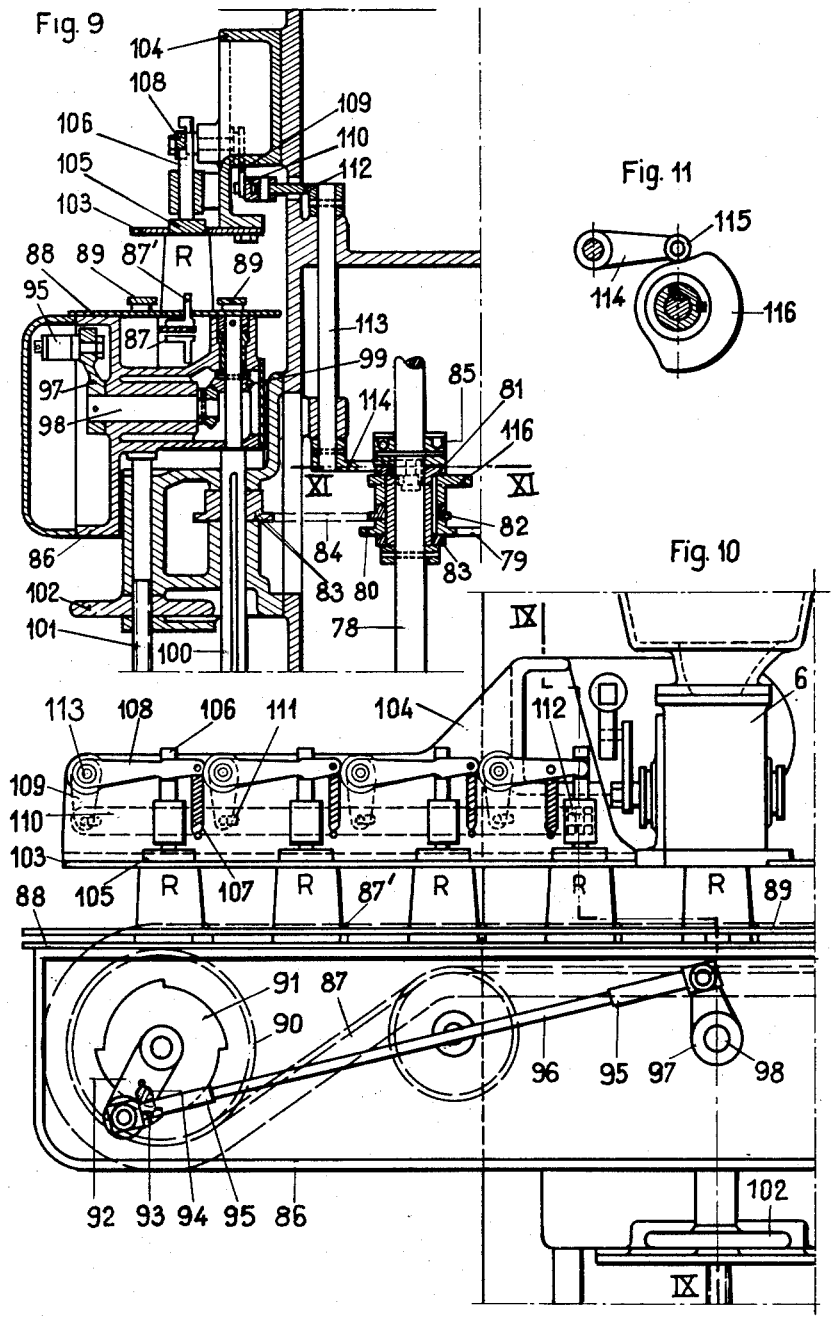

United States Patent Office 3,121,449
Patented Feb. 18, 1964

3,121,449
MACHINE FOR FILLING CANS OR OTHER
CONTAINERS
Yves Marchadour, 4 Rue St. Francois,
Quimper (Finistere), France
Filed Oct. 24, 1960, Ser. No. 64,681
7 Claims. (Cl. 141—161)

The invention relates to a machine for the continuous filling of cans or other containers, especially with paste-like tenacious or sticky and pieced filling materials, e.g. sausage meat, corned-beef, tunny pieces and the like, however possibly also with fine granulated, soft, liquid or half-liquid materials, said machine having the advantages of a very precise adjustment of the quantities to be dispensed and of quick and clean working.

For machines of this type it was known to feed the empty containers to the filling place by means of an intermittently rotating conveyor device and to provide the machine in the area of the filling place with a hopper-like feeding container for the material to be filled-in, the exit opening of which is controlled and opened automatically by the movement of the containers to be filled to the filling place and is closed again automatically after delivery of a predetermined filling quantity.

From known filling machines of this type the machine according to the present invention is differing by the fact that its hopper-like store and feeding container is seated on the casing of a rotary valve which is connected with the open end of a pump cylinder the opposite end of which is closed by a reciprocating piston, the rotary body of said rotary valve connecting the pump cylinder alternatively with the exit of the feeding container and with the outlet of the casing of the rotary valve disposed above the filling place. The equipment of the can-controlled closure device of the hopper-like feeding container with a piston pump which periodically receives the material to be filled-in, has the advantage that the piston pump can suck in the material to be filled from the feeding container, is allowing by the size of its receiving space determined by the length of stroke of the piston an exact adjustment of the filling quantity in adaption to the size of the cans to be filled, and finally is transporting under pressure the material to be filled out of the rotary valve into the cans.

By the suction work of the filling pump the obstruction of the outlet opening of the feeding container is prevented, and by its conveying pressure during the delivery of the material an obstruction of the rotary valve by sticky and coarsely pieced filling material is avoided.

According to a preferred embodiment of the invention the passage of the rotatable closure body seated within the rotary valve which is connecting the outlet opening of the feeding container with the cylinder of the filling pump, has a separated exit which may contain an exchangeable exit nozzle and which in the position of delivery of the rotary valve body is connecting the outlet of the valve casing with the pump cylinder. The arrangement of this separate exit within the rotatable valve closure body has the particular advantage that on vertical arrangement of the feeding container with lower outlet and on horizontal arrangement of the filling pump the rotatable closure body of the valve is needing only a small rotation for connecting alternatively the pump cylinder with the feeding container and with the lower outlet opening of the valve casing.

The casing of the rotary valve may be provided in the area of its lower outlet opening with an electrical heating device for slightly heating the valve casing and thereby also the rotatable valve body seated within this casing in order to prevent that fat and grease are depositing and may adhere to the walls of the valve casing and to the rotatable closure body, thus facilitating also the sliding of the material through the rotary valve and avoiding a reduction of its grease content during the filling operation.

Preferably the hopper-like feeding container is provided with a rotatable conveyor worm seated in the axis of the container and extending up into its outlet said conveyor worm being stepwise driven in such manner that it will rotate merely in the conveying sense when the outlet of the container is in open connection with the pump cylinder. The drive of this conveyor worm can be timed with the drive of the pump piston in such manner that the conveyor worm is driven merely during the suction stroke of the pump piston. Under the simultaneous influence of the pressure of the conveyor worm and of the suction of the pump piston a reliable passage of the material out of the feeding container into the pump cylinder is obtained also for sticky and coarsely pieced material.

In some cases it may suffice if the conveyor worm is arranged merely with a short winding at the outlet of the feeding container. For ensuring in this case the dispense of a sufficiently big quantity of material with a short partial rotation of the conveyor worm, the feeding container may be provided at its outlet with a horizontal bottom surface on which the conveyor worm is sliding with a broad end of its winding for pressing the material into an outlet passage disposed laterally in the bottom surface on which the conveyor worm is rotating. In this arrangement the conveyor worm is scraping with its winding on the bottom surface of the container and is cleaning the latter in such way that no rotating deposits will remain in the container.

For obtaining a precise timing between the drives of the conveyor worm and of the piston of the filling pump these drives are conveniently derived from a common driving shaft which is driving an intermediate shaft provided wtih a ratchet gear for the drive of the conveyor worm, said common driving shaft effecting the drive of the pump piston by means of a cam disk and of a crank gear. This crank gear is conveniently provided with an adjustment device for the variation of the stroke of the pump piston, said stroke adjustment of the pump piston allowing an exact and sensitive control of the filling quantity for the cans to be filled. Said common driving shaft is preferably effecting also the drive of the rotatable closure body of the rotary valve by means of a cam which on each rotation of the driving shaft is reciprocating a driving rod which is engaging the rotatable valve closure body.

The feeding of the empty cans or other containers to the filling place is conveniently effected by a star-like conveyor rod disposed below the rotary valve, said conveyor rod being step-wise driven from the said common driving shaft by means of a known Geneva-gear.

The filling machine according to the invention may be completed by a plurality of pressure pushers which during the transportation of the filled containers still are exerting a pressure on the material which has been filled into the containers for removing any air-inclusions within the filling material and for obtaining a better access of the container rim when the cans are closed. In this case the feeding of the empty cans to the filling station and the transportation of the filled cans to the pressure pushers is effected conveniently by fingers of a step-wise moving conveyor chain which is transporting the containers on a straight-lined conveyor path at first under the rotary valve at the filling station and then in partial movements under the pressure pushers arranged above the conveyor path. In this case the gear casing of the conveyor chain which is forming by its upper surface the conveyor path for the filled cans or containers may be adjustable in height with regard to the rotary valve and to the pressure pushers which are arranged on same level with the valve outlet, thus allowing an adaption of the machine to varying heights of the containers or cans.

The drawing is showing an example for the realisation of the filling machine according to the invention. There are showing FIG. 1 a vertical section through the essential parts of the machine;

FIG. 2 a horizontal section along line II—II of FIG. 1 through the drive of the conveyor worm of the feeding container;

FIGS. 3 and 4 horizontal sections through the gear disposed within the socket of the machine according to lines III—III and IV—IV of FIG. 1;

FIG. 5 a horizontal section through the gear casing of the socket approximately along line V—V of FIG. 1;

FIGS. 6 and 7 the front view and a lateral view in vertical section of an altered construction of the lower end of the feeding container;

FIG. 8 a plane view of the bottom of the feeding container seen from above without the conveyor worm;

FIG. 9 a vertical cross section along line IX—IX of FIG. 10 through the additional device for pressing the filled material into the cans;

FIG. 10 the front view of this device, and

FIG. 11 a part of the gear in horizontal section according to line XI—XI of FIG. 9.

The machine has a socket formed by a gear casing 1 and is provided with a container 2 receiving the material to be filled into the cans, said container having a hopper-like outlet end 3 and containing a conveyor worm 4 rotatable around the hopper axis. The feeding container 2 is seated with its outlet end 3 and with its outlet opening 5 onto the casing 6 of a rotary valve 7 which is fixed with a lateral joint to the gear casing 1. The rotary valve 7 is provided with a passage and with an additional outlet opening containing an exchangeable nozzle-like insert 8. The casing of the rotary valve is provided at its lower end with a horizontal surface to the rim of which an electrical heating device 9 is mounted. This heating device is slightly to heat the casing 6 and the rotary valve 7 in order to avoid that grease of the filling material may adhere to these elements. The horizontal lower surface of the valve casing 6 contains a central outlet opening under which FIG. 1 is showing one of the containers R to be filled.

The lateral joint of the valve casing 6 which is fixed to the gear casing 1 is in open connection with a cylinder 10 which is closed at its opposite end by the piston 11 of a filling pump, said piston being sealed by a stuffing box. The valve casing 6 and the passage of the rotatable valve body 7 are formed in such way that in its position shown in FIG. 1 the rotatable valve body is connecting by its passage the outlet opening 5 of the feeding container with the cylinder 10 of the filling pump, while on a rotation for less than 90° in anti-clockwise sense it is lying with the nozzle insert 8 above the container R and is connecting the lower outlet opening of the casing 6 with the pump cylinder 10. The outlet of the feeding container 2 is closed in this position by the rotary valve 7.

The drive of all parts of the machine is effected by a main driving shaft 12 which is driving the pump piston 11 by a cam disk 13 and a crank rod 14. The latter is articulated to a swinging arm 15 pivoted on a rigid axis 15', said swinging arm containing a sliding piece 16 which is longitudinally displaceable by means of a spindle 17 and a hand wheel 18. The sliding piece 16 is carrying a roller 19 engaging the longitudinal groove of a U-shaped rail 21 rigidly mounted in transverse direction on the piston rod 20. By rotation of the hand wheel 18 the sliding piece 16 can be displaced within the swinging arm 15 for variation of the stroke of the piston 11 which may be reduced up to zero.

The drive of the rotary valve 7 is effected by a cam 22 of the main driving shaft 12, the peripheral surface of which is cooperating with rollers 23 the axes of which are mounted to a driving rod 24 of square cross section. The driving rod 24 is longitudinally reciprocating in slide bearings of the gear casing 1, is extending outside the gear casing up to a lever arm 25 of the rotary valve 7 and is engaging with a vertical slot of its head 26 a transverse pin seated at the end of said lever arm. On rotation of the shaft 12 its cam 22 is reciprocating the driving rod 24, the longitudinal movement of which is transmitted by its head into a reciprocating rotational movement of the rotary valve 7.

The conveyor worm 4 of the feeding container is driven from the main shaft by means of an intermediate shaft 27 connected to the main shaft 12 by sprocket wheels 29, 30 and by a chain 31 in the speed ratio 1:1. The intermediate shaft 27 has fixed thereto a lever 32 to which a pawl 33 is articulated at a pin 34. The pawl 33 is under the influence of a tension spring 35 and is provided at its free end with an upwardly projecting pin 36. The intermediate shaft 27 is furthermore carrying a freely rotatable ratchet wheel 37 which is provided on opposite sides with two ratchet teeth. Three sprocket wheels 38, 39, 40 are fastened on the hub of the ratchet wheel and are secured by an angular nut 41. The ratchet wheel 37 with the three sprocket wheels 38, 39, 40 is secured against axial displacement on the intermediate shaft 27 by means of a fixable ring 42. Below the three sprocket wheels the hub of the ratchet wheel 37 still is carrying a freely rotating ring provided with a radially extending inclined cam 43 and with a radially projecting arm 43a which is fastened to an angle 44 fixed to the gear box 50. At each rotation of the intermediate shaft 27 the inclined cam 43 is lifting the pawl 33 from its engagement with the ratchet wheel 37 when the upwardly extending pin 36 of the pawl is running onto the inclined cam 43. The rotation of the intermediate shaft 27 is transmitted to the shaft 45 of the conveyor worm 4 by means of one of the sprocket wheels 38, 39 or 40 by a chain 46 and by one of the sprocket wheels 47, 48 or 49 according to the chosen speed ratio. The entire driving gear for the conveyor worm is mounted within a gear box 50 placed on the gear casing 1.

At its lower end the shaft 12 is carrying a sleeve 51 on which are seated four sprocket wheels 52, 53, 54 and 55 which are secured by a ring nut 56. The sprocket wheels 53, 54 and 55 are connected by a chain 57 with one of three sprocket wheels 58, 59, 60 fastened to a shaft 61. This shaft is driven by means of a non-represented electro-motor.

At the upper end of the sleeve 51 the shaft 12 is provided with a groove of semi-circular cross section for positioning therein the cylindrical shaft of a coupling key 62 the bearing of which is completed by a coupling body 63 rigidly seated on the main driving shaft 12 and to which the coupling key 63 is rotatably mounted. A projection 62a of the key shaft is extending into the sleeve 51 and is shaped in its cross section in such way as not to project beyond the circumference of the shaft 12 in the one end position of the coupling key, thus allowing free rotation of the sleeve 51 on shaft 12. In this disengaging position the coupling key 62 is brought and secured by its striking against an abutment lever 64, and on its rotation to this disengaging position a resetting spring 65 for the coupling key is coming under tension, said spring arranged within a circumferential groove of the coupling body 63. The abutment lever 64 is rotatably mounted to a vertical axis of rotation 66 and is projecting with an arm 67 (FIG. 5) into the feeding path of the cans R to be filled. By means of a resetting spring the abutment lever 64 is permanently pressed with its inner end against the coupling body 63 and with its arm 67 into the feeding path of the cans R.

The drive of the feeding device for the cans R is effected by a Geneva-gear the driving lever 68 of which is engaging a six-armed Geneva-cross 70 by means of a roller 71, and is driven by the sprocket wheel 52 of the main shaft 12, a further sprocket wheel 72 and a chain 73 in the speed ratio 1:1. The Geneva-cross 70 is transmitting its step-wise rotation to a rotatable carrier plate 74 and to a star-like pocket disk 75 which both are fastened to the shaft 76 of the Geneva-cross by a hub body 77. The can feeding device is completed by driving rails 69.

The machine is working as follows:

Before the begin of a filling operation the sleeve 51 is disengaged. Therefore shaft 12 is in stillstand, while sleeve 51 is rotating on it and is driving by its sprocket wheel 52 and chain 73 the sprocket wheel 72 of the driving lever 68 for the Geneva-cross 70. On rotation of the Geneva-cross the pocket disk 75 is taking up one of the empty containers R from the feeding path formed by the guiding rails 69 and is moving it up to its striking against the arm 67 of the abutment lever 64. At this moment, lever 64 is lifted from the coupling body 63 as to releasing the coupling key 62. The permanently rotating sleeve 51 contains an inner longitudinal groove. When the latter is registering with the coupling key 62 the key is rotated by its resetting spring 65 and is penetrating with its projection 62a into the longitudinal groove of the sleeve 51, thus coupling the shaft 12 with the rotating sleeve 51. Shaft 12 is now rotating and is driving the piston 11 which will make its suction stroke. Simultaneously shaft 12 is driving by means of the intermediate shaft 27 also the conveyor worm 4 which is making merely a partial rotation up to the moment when the pawl 33 will strike against the cam 43 and will be disengaged with the ratchet wheel 37. During this first rotation of the shaft 12 the rotary valve 7 is in the position shown in FIG. 1 in which the filling material contained in the feeding containers 2 is conveyed into the pump cylinder 10 under the suction influence of the pump piston 11 and under the influence of the pressure of the rotating conveyor worm 4.

When this operation is finished, the periodically stopped Geneva-cross 70 is again driven and will rotate the pocket-wheel 75 by which the can or container R now will be displaced into the filling position below the casing 6 of the rotary valve. By the displacement of the can or container the arm 67 of the abutment lever will periodically be released. Under the influence of its resetting spring the abutment lever 64 will push again against the coupling body 63 and will catch the coupling key 62 which by its striking against the abutment lever 64 is disengaged under tensioning of the spring 65. By this disengagement the main shaft 12 will periodically again be stopped when the pump piston 11 is at the end of its suction stroke. However, during the displacement of the can or container R into the filling position the pocket wheel 75 will take up the next following container and will displace it into the position shown in FIG. 5 in which the arm 67 of the abutment lever will again be contacted and rotated for releasing the coupling key 62 by which the main shaft 12 will again be coupled. At the beginning of its rotation it will immediately displace by its cam 22 the driving rod 24 which is rotating the rotatable valve body 7 into its filling position in which its passage is connecting the pump cylinder 10 with the outlet of the rotary valve casing 6. Due to the special shape of the cam 22 the rotary valve is changing its position rather quick. The pump piston 11 is then displaced towards the rotary valve and is pushing thereby a quantity of the material to be filled-in corresponding to the volume of the pump cylinder, into the empty container R while the conveyor worm 4 still is stopped because the pawl 33 still is lifted and has not yet engaged the next tooth of the ratchet-wheel 37. At the end of the filling operation the Geneva-cross 70 is again rotated, and the same operations will repeat for the next container.

In the altered construction of the feeding container according to FIGS. 6–8 the outlet end of the container 3 is provided with a horizontal bottom surface. The conveyor worm 4 is formed merely by a short winding which is scraping with long lower edge on the bottom surface of the container end and is pressing the material into the outlet opening 5 which here is arranged laterally of the container axis and which is inclined opposite the direction of rotation of the worm 4, as shown in FIG. 8. This construction is advantageous especially for tenacious and hard filling material such as corned-beef.

According to FIGS. 9–11 the machine can be equipped additionally with a device for compressing the material after the filling into the containers. In this case the permanently rotating sleeve provided with the coupling key is positioned on a shaft 78 and obtains its drive by a chain 79 and by a sprocket wheel 80 fastened to the permanently rotating sleeve 81. The sleeve is carrying here a sprocket wheel 82 which is driving a sprocket wheel 83 by a chain 84 while the coupling body provided with the coupling key is indicated with 85. The transportation of the filled containers or cans R is effected by an oblong gear casing 86 containing a conveyor chain 87 and carrying a guide surface 88 on which the cans R are stepwise displaced between lateral guide rails 89 by fingers 87' of the conveyor chain. The latter is running over a sprocket wheel 90 seated on the axis of a ratchet disk 91 driven by a pawl lever 92 articulated to the same axis and which is carrying a pawl 93 which is pressed by a resetting spring 94 onto the circumference of the ratchet disk 91. The pawl lever 92 is driven by a crank rod 96 fixed to end pieces 95 the one of which is articulated to a crank 97. The crank 97 is fixed to a shaft 98 which is driven by a bevel gear 99 from a permanently rotating shaft 100. This shaft is constructed as key shaft and is driven by the sprocket wheel 83 within which the key shaft 100 is displaceable in longitudinal direction.

In this construction the gear casing 86 is adjustable in height by means of a screw spindle 101 and a hand wheel 102 which is seated between two rigid abutment surfaces of the machine frame.

The cans or containers R are displaced by the fingers 87' of the conveyor chain 87 on the guiding surface 88 below a sheet 103 fastened to a support 104, the filled cans or containers R thus coming below pressure pushers 105. These pushers are fixed to mandrels 106 connected to charging springs 107 by means of levers 108. These levers are angle levers articulated to the machine frame at their vertex, and are connected with each other at their arms 109 by a driving rod 110. This rod is provided with oblong holes 111 into which the lever arms 109 are engaging with pins in such way that already on a rather small displacement of the rod 110 towards the left side in FIG. 10 the springs 107 will press downwards all pushers 105 simultaneously. The driving rod 110 is displaced by a lever 112 seated on a vertically extending axis 113 which is rotated to and fro by a lever 114 (FIG. 11) contacting with a cam roller 115 a cam 116 seated on the sleeve 81.

The step-wise operating drives of the conveyor chain 87 and of the pressure pushers 105 are so timed to each other that the filled containers or cans R are coming in progression below the pressure pushers which are periodically entering into the stopped containers for compressing the material which has been filled-in.

The invention is not limited to particulars of construction. For instance the conveyor chain shown in FIGS. 9 and 10 may also be used for the feeding of the empty containers to the filling machine.

I claim:

1. A machine for filling cans or the like with a material of substantial consistency, comprising a feeding container having an outlet; means in said feeding container to force the material therein towards said outlet; a piston pump having an open end cylinder; a casing having a flat bottom surface and a filler outlet in said bottom surface; an intermittently operative conveyor device for transporting empty cans under said filler outlet with the rims of the cans substantially in contact with said flat bottom surface; a rotary valve mounted in said casing with its outer surface substantially tangent to said flat bottom surface and having a passage which connects said feeding container outlet with said cylinder in a first position of said valve and which connects said cylinder with said filler outlet in a second position of said valve; means to operate said piston pump in suction and said forcing means when said valve is in said first position, and to operate said piston pump in compression when said valve is in said second position and an empty container is in position under said filler outlet, said forcing means in said feeding container being constituted by a rotating conveyor worm; means to operate said worm only when said valve is in said first position and said piston pump effects its suction stroke, and wherein said feeding container has a horizontal bottom surface and said conveyor worm terminates in a scraping edge contacting said bottom surface, said feeding container outlet being laterally disposed in said bottom surface.

2. A machine according to claim 1, wherein said means to operate said piston pump and said forcing means constituted by said conveyor worm are mutually arranged so that said conveyor worm is operated for one full rotation during the whole suction stroke of said pump and said scraping edge comes to a stop at the end of said rotation above said feeding container outlet.

3. A machine according to claim 2, comprising a main driving shaft for operating said piston pump and said conveyor worm, and wherein said means to operate said conveyor worm are constituted by an intermediate shaft, means drivingly connecting said main shaft with said intermediate shaft, a ratchet wheel freely rotatable on said intermediate shaft and connected to drive said conveyor worm, a pawl for said ratchet wheel disposed on a pawl carrier lever rigidly connected to said intermediate shaft, and a fixed control cam engageable with said pawl to disengage the same periodically from said ratchet wheel.

4. A machine as claimed in claim 1, wherein the intermittently operative conveyor device includes a travelling conveyor chain and a rigid horizontal guiding surface over said chain and over which filled cans travel after leaving the filler outlet; said travelling conveyor chain having spaced upward fingers projecting through a slot in said guiding surface to engage and move said cans; driving means to intermittently operate said conveyor chain; vertically reciprocating pressure pushers mounted over said conveyor and filled cans, and pusher operating means synchronized with said chain guiding means to bear on said filled cans and press the filling material therein.

5. A machine as claimed in claim 4, wherein said pusher operating means comprises an operating lever for each pusher pivoted at one end and bearing, intermediate the ends thereof, on said pusher; resilient means for each level at the end away from the pivoted end to normally force the lever against the pusher to press the filling material into the can and intermittent operating means, synchronized with said chain driving means, pivoting said lever against the action of said resilient means.

6. A machine as claimed in claim 5 wherein said intermittently operating means is a reciprocating bar having a longitudinal slot corresponding to each lever and an arm secured to and pivotable with each lever; each arm having a pin at the end thereof loosely fitting in its corresponding slot and so disposed that it engages one end wall of the slot only in inoperative position of the pushers.

7. A machine for filling cans or the like with a material of substantial consistency, comprising a feeding container having an outlet; means in said feeding container to force the material therein towards said outlets; a piston pump having an open end cylinder; a casing having an outer surface and an inner bore joining said outer surface to define a filler outlet having sharp edges; an intermittently operative conveyor device for transporting empty cans under said filler outlet; a rotary valve mounted in said bore in such close fit as to produce, with said sharp edges of said filler outlet, a shearing action during rotation; said valve having a passage which connects said feeding container outlet with said cylinder in a first position of said valve and which connects said cylinder with said filler outlet in a second position of said valve; and means to operate said piston pump in suction and said forcing means when said valve is in said first position and to operate said piston pump in compression when said valve is in said second position and an empty container is in position under said filler outlet said forcing means in said feeding container being constituted by a rotating conveyor worm; means to operate said worm only when said valve is in said first position and said piston pump affects its suction stroke, and wherein said feeding container has a horizontal bottom surface and said conveyor worm terminates in a scraping edge contacting said bottom surface, said feeding container outlet being laterally disposed in said bottom surface.

References Cited in the file of this patent

UNITED STATES PATENTS

| | | |
|---|---|---|
| 1,761,383 | Bergmann | June 3, 1930 |
| 1,859,290 | Davis | May 24, 1932 |
| 2,032,163 | Bagby | Feb. 25, 1936 |
| 2,049,722 | Phillips eet al. | Aug. 4, 1936 |
| 2,663,482 | Gilberty | Dec. 22, 1953 |
| 2,854,170 | Borgardt et al. | Sept. 30, 1958 |

FOREIGN PATENTS

| | | |
|---|---|---|
| 113,614 | Australia | Aug. 6, 1941 |
| 1,236,431 | France | June 7, 1960 |